US010323202B2

(12) United States Patent
Jakobsson et al.

(10) Patent No.: US 10,323,202 B2
(45) Date of Patent: Jun. 18, 2019

(54) METHOD FOR REMOVING HYDROGEN SULFIDE FROM AN ACID GAS

(71) Applicant: HALDOR TOPSØE A/S, Kgs. Lyngby (DK)

(72) Inventors: Niklas Bengt Jakobsson, Kågeröd (SE); Claus Friis Pedersen, Vanløse (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 141 days.

(21) Appl. No.: 15/531,659

(22) PCT Filed: Dec. 3, 2015

(86) PCT No.: PCT/EP2015/078448
§ 371 (c)(1),
(2) Date: May 30, 2017

(87) PCT Pub. No.: WO2016/096447
PCT Pub. Date: Jun. 23, 2016

(65) Prior Publication Data
US 2017/0335213 A1 Nov. 23, 2017

(30) Foreign Application Priority Data
Dec. 19, 2014 (EP) .................................. 14199308

(51) Int. Cl.
B01D 53/86 (2006.01)
B01D 53/22 (2006.01)
B01D 53/52 (2006.01)
B01D 53/75 (2006.01)
C10L 3/10 (2006.01)

(52) U.S. Cl.
CPC .............. *C10L 3/103* (2013.01); *B01D 53/22* (2013.01); *B01D 53/229* (2013.01); *B01D 53/75* (2013.01); *B01D 53/8612* (2013.01); *B01D 2255/207* (2013.01); *B01D 2256/245* (2013.01); *B01D 2257/304* (2013.01); *B01D 2258/05* (2013.01); *C10L 2290/06* (2013.01); *C10L 2290/548* (2013.01)

(58) Field of Classification Search
None
See application file for complete search history.

(56) References Cited

U.S. PATENT DOCUMENTS

| 3,534,529 A | 10/1970 | Mattia |
| 3,535,528 A | 10/1970 | Porter |
| 5,556,449 A | 9/1996 | Baker et al. |
| 6,099,819 A | 8/2000 | Srinivas et al. |
| 7,060,233 B1 | 6/2006 | Srinivas et al. |
| 2004/0057886 A1 | 3/2004 | Paulsen et al. |
| 2007/0240565 A1 | 10/2007 | Doong et al. |
| 2011/0290110 A1* | 12/2011 | Zhou .................. B01D 53/1475 95/45 |
| 2012/0251436 A1 | 10/2012 | Alkhazov |

FOREIGN PATENT DOCUMENTS

WO    WO 03/014015 A1    2/2003

OTHER PUBLICATIONS

International Search Report (PCT/ISA/210) dated Mar. 2, 2016, by the European Patent Office as the International Searching Authority for International No. PCT/EP2015/078448.
Written Opinion (PCT/ISA/237) dated Mar. 2, 2016, by the European Patent Office as the International Searching Authority for International Application No. PCT/EP2015/078448.
International Prelimiary Report on Patentability (PCT/IPEA/409) dated Apr. 7, 2017 for International Application No. PCT/EP2015/078448.
European Search Report dated Jun. 17, 2015 for Application No. 14199308.9.
Kuo-Tseng Li, et al., "Selective Oxidation of Hydrogen Sulfide to Sulfur on Vanadium-Based Catalysts Containing Tin and Antimony", . Eng. Chem. Res. 40, pp. 1052-1057, (2001.

* cited by examiner

*Primary Examiner* — Daniel Berns
(74) *Attorney, Agent, or Firm* — Buchanan Ingersoll & Rooney P.C.

(57) ABSTRACT

A method for removing hydrogen sulfide ($H_2S$) from an acid gas comprises feeding the gas to a membrane separation unit, collecting the product gas from the membrane unit, heating the permeate stream to the necessary inlet temperature for catalytic oxidation of $H_2S$ and feeding the heated permeate stream to a catalytic oxidation unit, where $H_2S$ is oxidized to $SO_2$. The heating of the permeate stream is accomplished by using a fraction of the feed gas to heat the permeate stream in a separate heater or by using a steam-fired heater. The method is especially suited for use on an off-shore facility.

9 Claims, No Drawings

METHOD FOR REMOVING HYDROGEN SULFIDE FROM AN ACID GAS

The present invention relates to a method for removing hydrogen sulfide from an acid gas. More specifically, a stream of acid gas containing hydrogen sulfide ($H_2S$) and carbon dioxide ($CO_2$) is removed from a hydrocarbon-containing gas, such as natural gas, associated gas or biogas, and subjected to a treatment to remove $H_2S$ involving a novel use of certain known catalysts in combination with membrane separation technology, as will be specified in the following.

Although the terms "acid gas" and "sour gas" are sometimes used interchangeably, a sour gas is any gas that specifically contains $H_2S$ in significant amounts, whereas an acid gas is any gas that contains significant amounts of acidic gases such as $CO_2$ and $H_2S$. As used herein, the term "acid gas" is primarily defined as a gas which is separated from a hydrocarbon stream using membrane technology, and which contains carbon dioxide as a dominating component with sulfur components, such as hydrogen sulfide, carbonyl sulphide ($CS_2$) as well as low amounts of hydrocarbons (C1-C8) corresponding to the permeability of these components in the membrane.

In the present context, "associated gas" is defined as any gaseous hydrocarbon stream also containing $CO_2$ and sulfur components, such as $H_2S$ and COS, which is produced as a side product within crude oil production.

For bulk removal of $CO_2$ and $H_2S$ at off-shore platforms, membrane technology is often used. Bulk removal of sour gas has certain advantages with respect to pipeline transport of the gas to shore. When the membrane unit is in operation, increasing the operation temperature leads to a lower throughput and allows a certain slip of hydrocarbons to the permeate side of the membrane. In practice, this means that the $CO_2$ and $H_2S$ containing stream can be flared on the platform, whereby $H_2S$ is converted to $SO_2$ in a thermal process. However, flaring implies loss of a valuable product that could instead have been transported to shore and sold.

On an off-shore natural gas production platform, it is commonly seen as a major issue, from a safety point of view, to have a flare or thermal oxidizer on the same platform as the gas production. A flare or thermal oxidizer would be needed in order to oxidize hazardous components, such as $H_2S$ and COS, to much less harmful components, such as $SO_2$. In the industry, this is often solved by establishing a separate platform situated at a distance from the gas production platform and from the site where the flare or the thermal oxidizer is placed. Using a membrane separation unit together with catalytic oxidation of i.a. $H_2S$ and COS would—apart from the savings in energy from not using support fuel in the flare—provide a major cost benefit in making it unnecessary to build such a platform as well as gas piping to this platform.

A common method for the abatement of $H_2S$ has so far been elimination by thermal incineration and catalytic oxidation. The thermal incineration is costly, as it requires the addition of a support fuel and incineration at temperatures above 800° C., whereas prior art catalytic oxidation has been in the presence of a catalytic material comprising a noble metal, typically with the oxidation of $H_2S$ taking place at a temperature above 280° C. Such catalytic oxidation may thus also require support heating.

The oxidation of $H_2S$ could in principle be performed in a regenerative thermal oxidizer (RTO), which would require less fuel compared to non-regenerative thermal oxidation, i.e. flaring. However, RTOs are too large and heavy to be applicable on off-shore platforms. Moreover, the thermal process requires a temperature of between 800 and 1200° C. depending on the gas composition and the slip allowed, so this in situ oxidation of $H_2S$ in a regenerative thermal oxidizer is not an attractive option.

It has now turned out that it is possible to carry out the $H_2S$ oxidation on the offshore platform by using a combination of membrane separation technology and a certain group of catalysts which are known per se, albeit for other purposes.

From U.S. Pat. No. 3,534,528 it is known to remove sulfur (as $H_2S$) from a natural gas well by diffusion through polymeric membranes. This patent, however, only describes the membrane technology and does not describe any further treatment of the $H_2S$-containing gas.

U.S. Pat. No. 5,556,449 describes processes for treating gas streams containing $H_2S$ and $CO_2$, particularly gas streams from fossil fuel gasification processes, using a membrane that maintains a high $H_2S$/methane selectivity and an adequate $H_2S/CO_2$ selectivity when measured with multicomponent gas mixtures at high pressure. It is stated that the permeate gas can be used to make sulfuric acid or elemental sulfur. This is not directly relevant and not within the field of use of the present invention.

The removal of acid gas from hydrocarbon gas mixtures by selective absorption in a gas separation unit offshore is described in WO 2013/082242. The acid gas components are adsorbed on a sterically hindered amino ether sorbent. The process is capable of removing $H_2S$ from gas mixtures which also contain $CO_2$ in addition to the hydrocarbon components.

U.S. Pat. No. 7,060,233 discloses a process for removing $H_2S$, other sulfur-containing compounds and/or sulfur and mercury from a gas stream contaminated with mercury, $H_2S$ or both. This patent only concerns gas treatment to obtain elemental sulfur and does not mention membrane technology.

In WO 03/014015, an improved process for the recovery of sulfur from gases containing $H_2S$ is described. However, this patent application only refers to Claus technology. There is a pre-heating using catalytic oxidation of $H_2S$ to $SO_2$, but that takes place within the Claus process itself. Generally, this patent application does not consider membrane technology or any other upstream processing of the feed gas.

Furthermore it is known to use various technologies to remove $H_2S$ and $CO_2$ on offshore platforms. Thus, a system for the removal of $H_2S$ and $CO_2$ from natural gas via absorption and disassociation utilizing counter-current scrubbers and a seawater contact system is described in US 2004/0057886, and specific membrane reactors for gas separation are known from e.g. US 2007/0240565, which describes a system for selective removal of $CO_2$, $H_2S$ and $H_2$ from a gaseous fluid mixture, the system comprising three consecutive membrane sections, one for each species to be removed.

Catalysts and catalytic processes for selective oxidation of $H_2S$ are i.a. known from U.S. Pat. No. 6,099,819 which describes catalysts for the partial oxidation of $H_2S$ to elemental S and $H_2O$, the catalytically active component being $TiO_2$ in mixture with one or more metal oxides of transition metals or lanthanide metals. A multistage oxygen-added catalytic partial oxidation process and apparatus for converting $H_2S$ in an acid gas stream to elemental S and $H_2O$ are disclosed in U.S. Pat. No. 7,108,842; the most preferred catalyst is a Pt—Rh alloy containing an alkaline element and/or one or more lanthanide elements.

US 2012/0251436 describes processes for sulfur recovery from H$_2$S-containing gases using catalytic conversion of H$_2$S to elemental S on a solid catalyst, especially an iron-zinc oxide catalyst, in a fixed-bed oxidation reactor followed by a Claus reaction. The selective oxidation of H$_2$S to elemental sulfur on vanadium-based catalysts containing Sn and Sb is described in Ind. Eng. Chem. Res. 40, p. 1052-1057 (2001).

The present invention concerns the use of certain known catalysts in combination with established membrane separation technology, said combination being novel and making it possible to remove H$_2$S at off-shore platforms without having to flare the acid gas on site.

The method according to the invention comprises the steps of:
- feeding the gas to a membrane separation unit, optionally after membrane pre-treatment, drying and/or extraction of higher hydrocarbons (i.e. hydrocarbons having a higher molecular weight than methane),
- collecting the product gas from the membrane unit,
- heating the permeate stream to the necessary inlet temperature for catalytic oxidation of H$_2$S to SO$_2$ according to the equation $$H_2S + 1.5O_2 \rightarrow SO_2 + H_2O$$

and
- feeding the heated permeate stream to a catalytic oxidation unit, where the H$_2$S is oxidized.

The heating of the permeate stream may be accomplished by using a fraction of the feed gas to heat the permeate stream in a separate heater. An alternative is to pre-heat the permeate stream by using a steam-fired heater.

The hydrocarbon-containing gas to be fed to the membrane separation unit can be natural gas, associated gas or biogas. Associated gas is a form of natural gas, which contains CO$_2$ and sulfur components, such as H$_2$S and COS, and which is found together with deposits of petroleum, either dissolved in the oil or as a free "gas-cap" above the oil in the reservoir. Due to the remote location of many oil fields, either at sea or on land, associated gas is usually burnt off in gas flares instead of being exploited.

The catalyst to be used in the catalytic oxidation unit is a monolithic metal oxide catalyst consisting of one or more metal oxides. Preferably the metal is taken from the group comprising V, Cr, W, Ce, Mo, Nb, Fe, Si, Ti, Al, Ca and Mg, and one or more supports taken from the group comprising Al$_2$O$_3$, SiO$_2$, SiC and TiO$_2$, optionally in the presence of other elements in a concentration below 1 wt %.

A monolithic, catalytically active material (or a catalyst monolith) is a specific physical configuration of a catalyst, in which a structural substrate (with little or no contact with the reacting gas) is covered by a porous support, on which the active material is deposited.

The invention is illustrated further by the following example showing the advantages of the method of the invention over the prior art.

EXAMPLE

A nominal gas feed stream is supplied in an amount of 400,000 Nm$^3$/h at a pressure of 25 bar gauge and a temperature of 30° C. This gas feed stream has the following composition: 39% CO$_2$, 1.5% N$_2$, 44.6% methane, 6.8% ethane, 4.9% propane, 1% butane, 0.3% pentane and 1.9% higher hydrocarbons (C$_{5+}$).

The gas feed stream is passed through a membrane separation unit, resulting in a product gas stream which may contain 22% CO$_2$ and 50 ppm H$_2$S. A normal membrane pre-treatment, drying, extra compression and extraction of natural gas liquids may have been applied.

The permeate stream is in an amount of around 70,000 Nm$^3$/h CO$_2$ with around 28 ppm H$_2$S. It exits the membrane separation unit at a pressure close to ambient pressure.

In order to thermally oxidize the H$_2$S, a temperature of 700-900° C. is needed. The exact lower temperature limit for the membrane operation is set by the hydrate formation temperature, but it is often in the range of 10-20° C. In the case of using a thermal oxidation process, an equivalent of 30-35 MW will be needed for this CO$_2$ dominated stream to reach a temperature of 800° C. This corresponds to approximately 100 MM BTU/h or—with a gas price of 10 US$ per MM BTU—to approximately 3.5 MM US$ per year or around 3000 Nm$^3$/h natural gas for flaring the permeate stream.

There are two ways of providing the fuel needed for the flare:
- to operate the membrane at a higher temperature and let fuel slip to the permeate side through the membrane, or
- to route dedicated fuel to the flare.

Both methods are employed in practice.

In contrast, a catalytic oxidation unit of the type used in the method of the invention will require an inlet temperature of 250° C. and 9 MW or 870 Nm$^3$/h of fuel. This will represent a fuel saving of 2.5 MM US$ per year. In this case, the membrane should operate as cold as possible without any risk of hydrate formation, and the necessary fuel is to be routed directly to a pre-heat burner to heat the inlet of the catalytic oxidation unit. Other heat sources, such as steam, may also be used to pre-heat the feed gas stream to the catalytic oxidation unit.

The invention claimed is:

1. A method for removing hydrogen sulfide (H$_2$S) from an acid gas, said method comprising the steps of:
    feeding the acid gas to a membrane separation unit, optionally after membrane pre-treatment, drying and/or extraction of higher hydrocarbons, and separating the acid gas into a product gas and a permeate stream,
    collecting the product gas from the membrane unit,
    heating the permeate stream to an inlet temperature for catalytic oxidation of H$_2$S over a monolithic metal oxide catalyst consisting of one or more metal oxides, and
    feeding the heated permeate stream to a catalytic oxidation unit and oxidizing the H$_2$S to SO$_2$, wherein the catalytic oxidation unit comprises the monolithic metal oxide catalyst, and wherein the monolithic metal oxide catalyst oxidizes the H$_2$S to SO$_2$ according to the equation $$H_2S + 1.5O_2 \rightarrow SO_2 + H_2O$$

wherein the heating of the permeate stream is accomplished by using a fraction of the acid gas to heat the permeate stream in a separate heater, or
wherein the heating of the permeate stream is accomplished by using a steam heater, wherein the membrane separation unit and the catalytic oxidation unit are located on an off-shore facility.

2. The method according to claim 1, wherein the acid gas is natural gas.

3. The method according to claim 1, wherein the acid gas is biogas.

4. The method according to claim 1, wherein the acid gas is associated gas.

5. The method according to claim 1, wherein the monolithic metal oxide catalyst comprises a metal oxide and a support, wherein the metal of the metal oxide in the catalyst is selected from the group consisting of V, Cr, W, Ce, Mo, Nb, Fe, Si, Ti, Al, Ca and Mg, and wherein the support is selected from the group consisting of $Al_2O_3$, $SiO_2$, and $TiO_2$.

6. The method according to claim 1, wherein the heating of the permeate stream is accomplished by using a fraction of the acid gas to heat the permeate stream in a separate heater.

7. The method according to claim 1, wherein the heating of the permeate stream is accomplished by using a steam heater.

8. The method according to claim 1, wherein the permeate pre-heating stream is heated to a temperature is within the temperature range 180-400° C.

9. The method according to claim 8, wherein the permeate stream is heated to a temperature within the temperature range 220-350° C.

* * * * *